M. R. RUBLE.
Smut Mill.
No. 90,875.
Patented June 1, 1869.
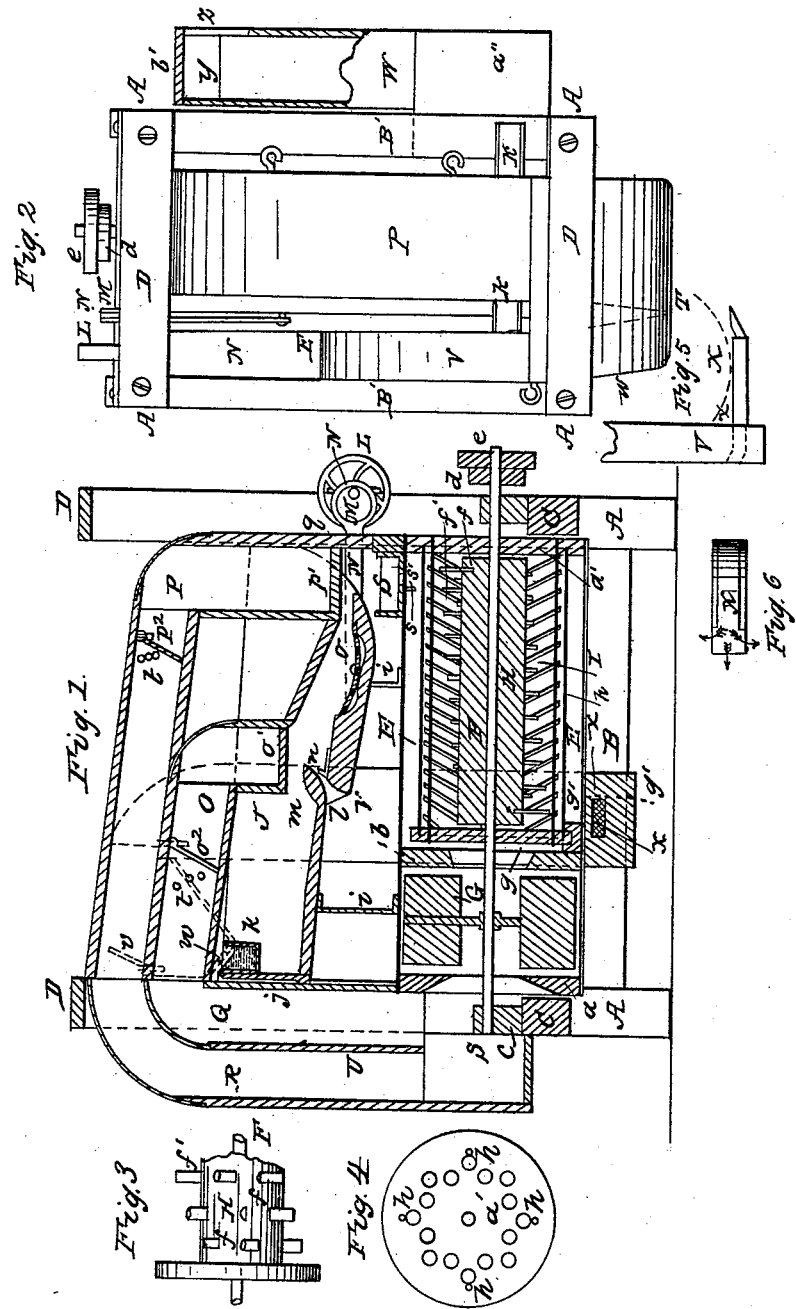

United States Patent Office.

MARTIN R. RUBLE, OF NINEVEH, INDIANA.

Letters Patent No. 90,875, dated June 1, 1869.

IMPROVED SMUT-MACHINE.

The Schedule referred to in these Letters Patent and making part of the same.

*To all whom it may concern:*

Be it known that I, MARTIN R. RUBLE, of Nineveh, in the county of Johnson, and State of Indiana, have invented a new and useful Improvement in Smut-Machines; and I do hereby declare that the following is a full, clear, and exact description thereof, sufficient to enable others skilled in the art to which my invention appertains, to make and use the same, reference being had to the accompanying drawings, forming part of this specification, in which—

Figure 1 is a longitudinal vertical central section of a smut-machine, constructed according to my invention.

Figure 2 is a top view of the same.

Figures 3, 4, 5, and 6 are detail views, to be hereinafter referred to.

My invention consists in the construction, arrangement, and combination of parts, as hereinafter fully described.

Similar letters of reference indicate corresponding parts in the several figures.

In the drawings—

A A represent the corner-posts of the frame-work;

B B', the horizontal side-pieces; and

C C, the transverse end-pieces of the same.

The posts at each end are connected together by cross-pieces D D.

E is a cylinder, extending from end to end of the frame, and supported therein in any suitable manner.

This cylinder has heads $a$ $a'$, of which the latter is perforated, as shown more clearly in fig. 4.

$b$ represents a partition, which divides the cylinder into two compartments.

F represents a shaft passing through the centre of the cylinder, and mounted in brackets $c$ $c$, and provided at one end with pulleys $d$ $e$.

On this shaft F, between the partition $b$ and cylinder-head $a$, a fan, G, is mounted.

The head $a$ and partition $b$ are not solid, but are made with large central openings.

H represents a cylindrical wooden stock, fitted into the shaft F.

In the periphery of this stock are set spiral rows of beaters $f$ $f'$, as shown clearly in fig. 3.

The first two rows of beaters, $f$, are half round, and serve to start the wheat between the rows of round beaters $f'$.

I is a sheet-metal cylinder, formed with parallel slots, inclined in opposite directions.

This cylinder encloses the beaters, and is secured in the head $a'$ of the main cylinder, and a smaller head, $g$, the latter being made fast to the former by rods $h$ $h$.

J represents the trough, provided with supports $i$ $i$, which rest on top the cylinder.

K is a transverse shaft, on which a belt-pulley, L, and an eccentric-pulley, M, are keyed.

N is a pitman, pivoted to the trough J, and having a ring formed at its opposite end, in which works eccentric-pulley M.

By means of this mechanism, the trough is shaken or reciprocated.

A flat spring is secured to the inner end of the trough.

This spring presses against the partition $j$, and not only lessens the shock caused by the contact of the trough against said partition $j$, but also assists the eccentric and pitman in giving the return motion of the trough.

$k$ $k$ are spouts, attached to the opposite sides of the trough J.

Through these spouts the grain is deposited in the trough.

A transverse opening, $l$, is made in the bottom of the trough, for the admission of air.

To prevent the escape of grain through this opening, inclined ledges, $m$ $n$, are formed at the opposite sides of the opening.

A deep hollow is made in the bottom of trough J.

A perforated concave plate, $o$, covers this hollow, but leaves under it a vacant space.

The perforated plate $o$ forms a cockle and sand-screen.

These substances fall through, as the wheat passes over, into the space beneath, from which they may be removed at an opening in the side of the trough.

Above, and partly within the trough J, are located the suction-spouts O P.

These spouts are made together, and open at $O^1$ $P^1$, respectively, directly into the trough J.

The part $q$, of the suction-spout P, extends downward, and rests upon a block, $r$, which has a straight upper side and a concave lower surface, to fit the top of the cylinder on which it rests.

$s$ is a spout, inclined from each end toward the centre, and having a projection on its under side, which enters an opening made in the top of the cylinder.

An opening in the bottom of said spout registers with the opening in the cylinder.

The spout is attached to the block $r$.

$O^2$ $P^2$ are valves, placed respectively in the spouts O P, to regulate the draught.

Several holes, $t$, are made near each valve, through which pins may be inserted to support the valve in different positions.

The spouts O P communicate respectively with the spouts Q R.

These spouts enter a chamber, S, which communicates with the fan-chamber.

A vertical partition, T, (shown in dotted lines in fig. 2,) is arranged at right angles to the partition U, and forms one side of a spout, the other side of which is the side-piece $u$.

This latter spout opens at its lower end into the space S, and it communicates at the top with a spout, V, which is partly shown in red lines in fig. 1.

*v* is a valve, (shown in red,) located at the mouth of spout V.

*w* represents a flap-valve, situated below the valve *v*.

The spout V is open at its lower end, and an opening, *x*, is made in one side near said lower end.

A spout, X, figs. 5 and 6, extends from this opening to about the centre of the under side of the cylinder A, which is provided with a discharge-orifice at this point.

W, fig. 2, is a spout, which communicates by a side-extension, shown in dotted lines, with the fan-chamber.

This spout is provided with an opening, *y*, in its bottom, and an opening, *z*, in the side, near the top.

The bottom of this spout is inclined, so as to conduuct the heavier substances to the point of discharge *y*.

I will now proceed to describe the operation of my machine.

The wheat is thrown into the trough J by way of the spout *k*, and is checked in its passage by the projection *m*.

The trough J being continually shaken, the light, foreign matters, as chaff, are forced to the top.

The fan being in operation, these light substances are drawn by the suction into the spout O, a draught being created through the opening *b* in the bottom of the trough.

The wheat now passes over the cockle and sand-screen *o*, and as it falls from the trough J into the spout *s*, is subjected to the action of air drawn in at P'. The wheat falls through the openings *s'*, and enters the cylinder I, where it is subjected to the action of the beaters, and passed through the cylinder.

The cylinder being slotted, as shown, and exposed to the full force of the fan, the dust is drawn from the wheat as soon as scoured off the same.

The wheat, still in motion, falls through the opening *g'*, into a spout placed underneath, and is thereby conducted into the spout V.

This conductor is so made as to discharge the wheat in the spout V, from both sides, as well as at the end, as indicated by the arrows in fig. 6, thus spreading the wheat and exposing it to the suction caused by the fan.

This upward draught of air carries with it all the foreign substances, and if some of the wheat should be also carried up, it falls in the upper part of the spout V, and by way of the valve *w*, returns to the trough J.

The main body of wheat will be discharged, thoroughly cleansed, at the open lower end of spout V.

The refuse matter from all sources is drawn into the fan-chamber, and forced thence into the spout W, through the same, and out at the opening *z*. If, perchance, a few grains of wheat still remain with the refuse, they will be blown against the side *a''* of the spout W, and then fall on the inclined bottom of the spout, which will conduct them to the discharge opening *y*; or, if they do not fall at first, they must come in contact with the end *b'* of the spout and thence fall down and out at the opening *y*, while the lighter substances will, as before stated, be discharged in a stream from the upper opening *z*.

By the use of my improvement a very simple, durable, and effective machine is provided for the purpose intended.

Having thus described my invention,

What I claim as new, and desire to secure by Letters Patent, is—

1. The trough J, operated in the manner described, and having the transverse ridges *m n*, opening *l*, cockle and sand-screen *o*, and spouts *k k*, all constructed and arranged substantially as herein described.

2. The arrangement of the trough J, suction-spouts O P R S, vertical spout V, discharge-spout W, cylinder E, inner slotted cylinder I, beaters H *f f'*, fan G, and the intermediate conductors *k k s* X, all constructed, arranged, and operating substantially, as herein described.

To the above specification of my improvement in smut-machines, I have signed my name this 20th day of February, 1869.

MARTIN R. RUBLE.

Witnesses:
A. J. BELK,
WILLIAM HOLTZ.